US012273987B1

(12) United States Patent
Hadidi

(10) Patent No.: US 12,273,987 B1
(45) Date of Patent: Apr. 8, 2025

(54) DECOUPLED TUNABLE PLASMA SYSTEM FOR THE DISSOCIATION OF MOLECULAR FLUIDS

(71) Applicant: Kamal Hadidi, Sudbury, MA (US)

(72) Inventor: Kamal Hadidi, Sudbury, MA (US)

( * ) Notice: Subject to any disclaimer, the term of this patent is extended or adjusted under 35 U.S.C. 154(b) by 197 days.

(21) Appl. No.: 18/125,214

(22) Filed: Mar. 23, 2023

Related U.S. Application Data

(60) Provisional application No. 63/322,878, filed on Mar. 23, 2022.

(51) Int. Cl.
*H05H 1/24* (2006.01)

(52) U.S. Cl.
CPC .......... *H05H 1/24* (2013.01); *H05H 2245/10* (2021.05)

(58) Field of Classification Search
CPC ............................ H05H 1/24; H05H 2245/10
See application file for complete search history.

(56) References Cited

U.S. PATENT DOCUMENTS 8,664,561 B2 3/2014 Hadidi et al.

FOREIGN PATENT DOCUMENTS

JP 2008135286 A * 6/2008

OTHER PUBLICATIONS

Donovan et al. "Recent Advances in the Chemistry of Electronically Excited Atoms." Chem. Rev. 70(1970): 489-516.

Husain et al. "Collisional Quenching of Electronically Excited Nitrogen Atoms, N(22DJ,22PJ) by Time-resolved Atomic Absorption Spectroscopy." Farad. Disc. Chem. Soc. 53(1972): 201-210.

Kerscher et al. "Low-carbon hydrogen production via electron beam plasma methane pyrolysis: Techno-economic analysis and carbon footprint assessment." Int. J. Hydrogen Energy. 46(2021): 19897-19912.

Laporta et al. "Electron-impact resonant vibrational excitation and dissociation processes involving vibrationaly excited N2 molecules." Plasma Sources Sci. Technol. 23(2014): 065002.

Lin et al. "Reactions of Metastable Nitrogen Atoms." J. Chem. Phys. 55.8(1971): 3760-3770.

Matzing et al. "Chemistry of the electron beam process and its application to emission control." Pure Appl. Chem. 68.5 (1996): 1089-1092.

Richardson et al. "Modeling intense-electron-beam generated plasmas using a rigid-beam approximation." Phys. Plasmas. 28(2021): 093508.

Rouwenhurst et al. "From the Birkeland-Eyde process towards energy-efficient plasma-based NOX synthesis: a techno-economic analysis." Energy Environ. Sci. 14.5(2021): 2520-2534.

Smith et al. "Preference for Vibrational over Translational Energy in a Gas-Surface Reaction." Science. 304(2004): 992-995.

(Continued)

*Primary Examiner* — Henry Luong
(74) *Attorney, Agent, or Firm* — WOMBLE BOND DICKINSON (US) LLP; Deborah M. Vernon

(57) ABSTRACT

The present technology is directed to a system for controlling the electron energy distribution function in an atmospheric and near-atmospheric low-temperature plasma by subjecting the generated plasma to a repetitive nanosecond-pulsed voltage that is completely decoupled from the means that generated the plasma (i.e., decoupled from an electron-beam). The repetitive nanosecond-pulsed voltage generates a nanosecond-pulsed electric field that affects the energy of the electrons in the plasma without affecting the energy of the ions.

14 Claims, 10 Drawing Sheets

(56) References Cited

OTHER PUBLICATIONS

Snoeckx et al. "Plasma technology—a novel solution for CO2 converstion?" Chem. Soc. Rev. 46(2017): 5805-5863.
Suzuki et al. "Radiation Treatment of Exhaust Gases (VII)." J. Nuc. Sci. Technol. 15.8(1978): 597-601.
Walton et al. "Electron Beam Generated Plasmas for Ultra Low Te Processing." Ecs J. Solid State Sci. Technol. 4.6 (2015): N5033-N5040.
Wang et al. "Nitrogen Fixation by Gliding Arc Plasma: Better Insight by Chemical Kinetics Modelling." Chem. Sus. Chem. 10(2017): 2145-2157.
Weiss et al. "Energy Required to Produce One Ion Pair for Several Gases." Phys. Rev. 98.6(1955): 1828-1831.
Wolford et al. "NOx removal with multiple pulsed electron beam free of catalysts or reagents." Phys. Chem. Phys. 15(2013): 4422-4427.
Young et al. "The excitation and quenchng of N(2P)." J. Chem. Phys. 63(1975): 1150-1153.

* cited by examiner

FIG. 1

Table 2 Comparison of energy consumption for NO production in various plasma reactors

| Plasma type | Product (concentration) | Energy cost (MJ mol $N^{-1}$) |
|---|---|---|
| Electric arc (Birkeland–Eyde) | NO (2%) | 2.4–3.1 |
| Spark discharge | NO and $NO_2$ | 20.27, 40 |
| Transient spark discharge | NO and $NO_2$ | 8.6 |
| Pin-to-plane ns-pulsed spark discharge | NO and $NO_2$ | 5.0–7.7 |
| Radio-frequency crossed discharge | $HNO_3$ | 24–108 |
| Laser-produced discharge | NO and $NO_2$ | 8.9 |
| (Positive/negative) DC corona discharge | NO and $NO_2$ | 1057/1673 |
| Pulsed corona discharge | $HNO_3$ | 186 |
| Pin-to-plane DC glow discharge | NO and $NO_2$ | 7 |
| Pin-to-pin DC glow discharge | NO and $NO_2$ (0.7%) | 2.8 |
| Dielectric barrier discharge | NO and $NO_2$ (0.6%) | 56–140 |
| Packed dielectric barrier discharge | NO and $NO_2$ (0.5%) | 18 |
| DC plasma arc jet | NO (6.5%) | 3.6 |
| Propeller arc | NO and $NO_2$ (0.4%) | 4.2 |
| Pulsed milli-scale gliding arc | NO and $NO_2$ (1–2%) | 2.8–4.8 |
| Gliding arc plasmatron | NO and $NO_2$ (1.5%) | 3.6 |
| Rotating gliding arc | NO and $NO_2$ (5.4%) | 2.5 |
| Microwave plasma | NO and $NO_2$ (0.6%) | 3.76 |
| Microwave plasma with catalyst | NO (6%) | 0.84 |
| Microwave plasma with magnetic field | NO (14%) | 0.28 |

Lowest energy consumption & highest $NO_x$ yield at atmospheric pressure

Lowest energy consumption, but at low-pressure

*Table 2: Kevin H. R. Rouwenhorst et al., Energy & Environmental Science · March 2021. – highlighting and annotation from inventor*

Vibrationally-excited $N^2$ effect on activation energy of catalyst

DECOUPLED TUNABLE PLASMA SYSTEM FOR THE DISSOCIATION OF MOLECULAR FLUIDS

RELATED APPLICATIONS

This application claims priority to U.S. Provisional Application No. 63/322,878 filed Mar. 23, 2022. The entire contents of the foregoing applications are hereby incorporated by reference.

FIELD OF THE TECHNOLOGY

The present technology describes a system for controlling the electron energy distribution in an atmospheric and near-atmospheric low-temperature plasma by subjecting the plasma to a nanosecond pulsed voltage that is completely decoupled from the means that generated the plasma. The nanosecond-pulsed voltage generates a nanosecond pulsed electric field that affects the energy of the electrons in the plasma without affecting the energy of the ions. More specifically, the low-temperature plasma is generated by an electron-beam.

BACKGROUND

For the last 50 years, plasmas have been used in large industrial applications. Tailoring the type of plasma to a specific application is key to the commercial success of that application, as different types of plasma will have different efficiencies and different outcomes, depending on the application they are used for. For the last 20 years, there has been a large effort to use plasma for the dissociation of molecular species to produce chemicals such as ammonia, hydrogen, nitric acid, and others.

In the case of nitrogen fixation for example, Kevin H. R. Grootendorst et al[1]. give an extensive list of different types of plasma (FIG. 1) that have been studied for the fixation of nitrogen and compare the energy expense per nitrogen molecule fixated to that of the current reference methods for fixating nitrogen into ammonia (i.e., Haber-Bosch process.) The most efficient of these plasmas is the rotating gliding arc, which has an energy expense of 2.5 MJ/mol of nitrogen, is more than 5 times larger than the energy expense of the Haber Bosch process (0.48 MJ/mol).

Referring to FIG. 1, the so-called Birke land-Eyed process, uses an arc plasma in a mixture of oxygen and nitrogen to produce oxygen and nitrogen radicals that react together to produce nitric oxide (NO) through the so-called Zeldovich mechanism:

$$O+N_2 \rightarrow NO+N$$

$$N+O_2 \rightarrow NO+O$$

NO is then further oxidized into $NO_2$ at room temperature and then reacted with water to produce $HNO_3$. Here again, the energy is not specifically provided to the chemical bonds of $N_2$ and $O_2$ molecules, but rather to heat the entire gas stream at high temperatures. Also, the arc plasma inherently carries high energy losses through ionization, electronic excitation, and radiation, which do not help the dissociation of the molecules.

Low-temperature plasmas have also been used to dissociate molecular gases such as methane and nitrogen. Kerscher et al[2]. have reviewed the use of an electron-beam generated plasma for the production of hydrogen through the pyrolysis of methane. Also, Richardson et al.[3] have modeled the decomposition of nitrogen in an electron beam generated plasma. Other works have also used other types of on-thermal plasmas such as dielectric barrier discharge, hallo cathode, and gliding arc plasmas.

Wei Zhong Wang et al[4]. describe nitrogen fixation in a gliding arc plasma through chemical kinetics modelling and experimentation. In this case, a gliding arc plasma is used in a mixture of nitrogen and oxygen to produce NO.

FIG. 2A and FIG. 2B illustrate the fraction of electron energy transferred to different channels of excitation, ionization, and dissociation as a function of the reduced electric field and electron energy for oxygen and nitrogen molecules (shown in FIG. 2A) taken from Wei Zhong Wang et al.[4], and carbon dioxide molecule (shown in FIG. 2B) taken from R. Snoeckx et al[5].

For nitrogen molecule, the onset of the electronic excitation starts at a reduced electric field of 42 Td, which corresponds to about 2.3 eV. For $N_2$ direct electron impact dissociation, the onset reduced field is about 120 Td, which corresponds to 4.5 eV.

The optimum energy for incident electrons onto a nitrogen molecule to maximize the vibrational excitation process and minimize other processes is around 1.8 cV. It is around 0.3 eV for the oxygen molecule. Any electron with an energy higher than 2 eV will increase energy losses in the rotational and electronic excitation channels as well as ionization for the oxygen molecule. In FIG. 3 by Walton et al[6]. we can see that the electron energy distribution for an electron beam generated plasma in nitrogen partly overlaps with the total excitation cross section and barely overlaps with dissociation cross section curve. This clearly shows that for these plasma conditions, no energy would be wasted in ionization and very little energy would be coupled to the dissociation process. It also shows that for a nitrogen molecule which has the optimum vibrational excitation for an electron energy between 0.5 eV and 4 eV, a good portion of the EEDF will not be put to work with optimum condition for vibrational excitation, as the energy of the electrons is too low.

In the case of carbon dioxide, all vibrational excitation occurs at reduced fields between 1 and 100 Td, which correspond to an electron energy range of 0.5 ev to 4 eV as shown in FIG. 2B. Beyond that, most of the energy of the electrons is spent in ionization and electronic excitation.

None of the plasma systems described above have reached the efficiency of existing methods for the dissociation of any molecular species.

It is clear that there is a need for a plasma source, where the electron energy distribution function can be tailored to provide electrons with the optimum energy for vibrational excitation and minimize other processes such as electronic and rotational excitation.

Hadidi et al[7]. describe a system and method for selectively controlling the ion composition of an ion source. In that patent, a nanosecond pulse voltage generator is electrically connected to an electrode inside the low-pressure vessel where the plasma is generated. The plasma constitutes an impedance that is viewed by the plasma source power supply as a load. When a nanosecond pulsed voltage is applied to the plasma, it induces changes in the plasma that lead to a modification in the composition of the plasma. For example, certain ionic and neutral species may decline, whereas other ionic and neutral species may appear. This change in the chemistry of the plasma induces a change in the impedance, which in turn may force the power generation system to quickly adapt;

otherwise, the situation may lead to arcing and the destruction of the plasma source. The system described in the cited patent has its limitations as it does not decouple the means of creating the plasma from the means of controlling it. It also describes a low-pressure system, which is not suitable for continuous high-throughput processing of fluids.

Electron-beam generated plasma sources have been used in different applications. One of them is the destruction of $NO_2$ emissions from thermal combustion processes[8]. They have also been used for the destruction of volatile organic compounds such as carbon tetrachloride and trichloroethylene[9]. An electron-beam generated plasma is ideal for generating secondary low-energy electrons. In these systems, a primary beam of electrons is accelerated from a vacuum chamber through a thin metallic foil window into the atmosphere. These high-energy electrons collide with the molecules that are at atmospheric pressure and produce secondary electrons that quickly thermalize due to the high collision rate. For an electron-beam with a primary energy of 100 keV, and given the energy required to produce an ion-pair in dry air, which is roughly 34 eV, each primary electron will produce almost 3000 secondary electrons before completely losing its energy.

Also, Matthew F. Wolford et al[10]. describe a pulsed electron beam system for the removal of NOx from flue gases. In this system, the extraction of the electrons from the cathode is pulsed and a pulsed plasma is created in a plasma channel. While this method lowers the overall energy input into the plasma, it does not decouple the means of creating the atmospheric plasma (the electron beam) from the means of controlling it. The same authors describe their method and apparatus in a published US patent application, US 2017/0087509 A1.

In addition, F. Kerschen et al[2]. describe a low-carbon hydrogen production via electron beam plasma methane pyrolysis. In this article, the authors demonstrate that hydrogen gas can be economically produced by decomposing methane in an electron beam generated plasma without direct $CO_2$ emissions. The techno-economic analysis shows levelized costs of hydrogen for the plasma pyrolysis between 2.55 Euro/kg $H_2$ and 5.00 Euro/kg $H_2$. Also, the carbon footprint assessment indicates the high potential for a reduction of life cycle emissions by electron beam plasma methane pyrolysis (1.9 kg $CO_2$ eq./kg $H_2$ to 6.4 kg $CO_2$ eq./kg $H_2$, depending on the electricity source) compared to state-of-the-art hydrogen production technology (10.8 kg $CO_2$ eq./kg $H_2$).

We can clearly see that there is a great need for improving the efficiency of these plasma systems in order to lower the cost of the products they produce.

SUMMARY

In one embodiment, the present technology describes a system to control the electron energy distribution function in an atmospheric pressure or near atmospheric pressure low-temperature plasma, where the means for generating the plasma is completely decoupled from the means for controlling it.

The electron energy distribution function control system relies on the application of a repetitive nanosecond pulsed voltage potential to the plasma to affect the energy of the electrons without affecting the energy of the ions.

The repetitive nanosecond pulsed voltage potential generator can generate voltage pulses that are between 0.1 volt and 50000 volts with pulse duration between 0.1 nanosecond and 100 nanoseconds at a repetitive rate between 500 Hz and 1 MHz.

In some embodiments, the pulse duration of the voltage potential is chosen to be less than the inverse of the plasma frequency, so as not to affect the ions in the plasma.

The repetitive nanosecond voltage potential pulse is applied to a set of electrodes that encompass the plasma, where one electrode is isolated from the ground and connected to the repetitive nanosecond voltage pulse generator and the second electrode is connected to the ground.

In another embodiment, the present technology intends to lower the energy consumption for dissociating molecular fluids in a low-temperature plasma by controlling the electron energy distribution function of the plasma and by incorporating a catalyst material near the controlled plasma to increase the dissociation rates of the molecular gas.

In yet another embodiment, the present technology intends to lower the energy consumption for dissociating molecular fluids in a low-temperature plasma by controlling the electron energy distribution function of the plasma and by incorporating a catalyst material near the controlled plasma to increase the dissociation rates of the molecular gas, and by incorporating a heating element into the catalyst material to increase its temperature in order to increase the dissociation rate of molecular gases.

BRIEF DESCRIPTION OF THE DRAWINGS

FIG. 1: Comparison of energy consumption for various plasma reactors.

DETAILED DESCRIPTION

Figure 2B:
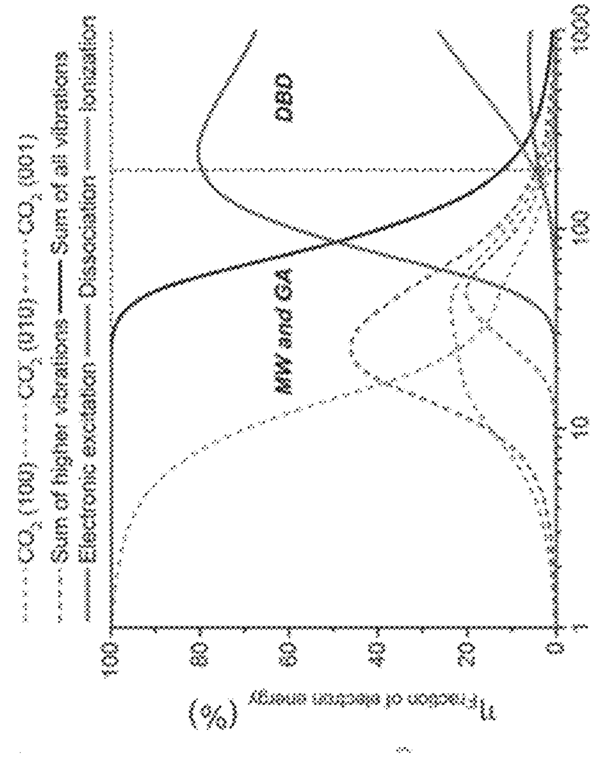
FIG. 2B: Represents the fraction of electron energy transferred to different channels of electronic excitation, vibrational excitation, dissociation, and ionization for carbon dioxide.
Figure 2A:
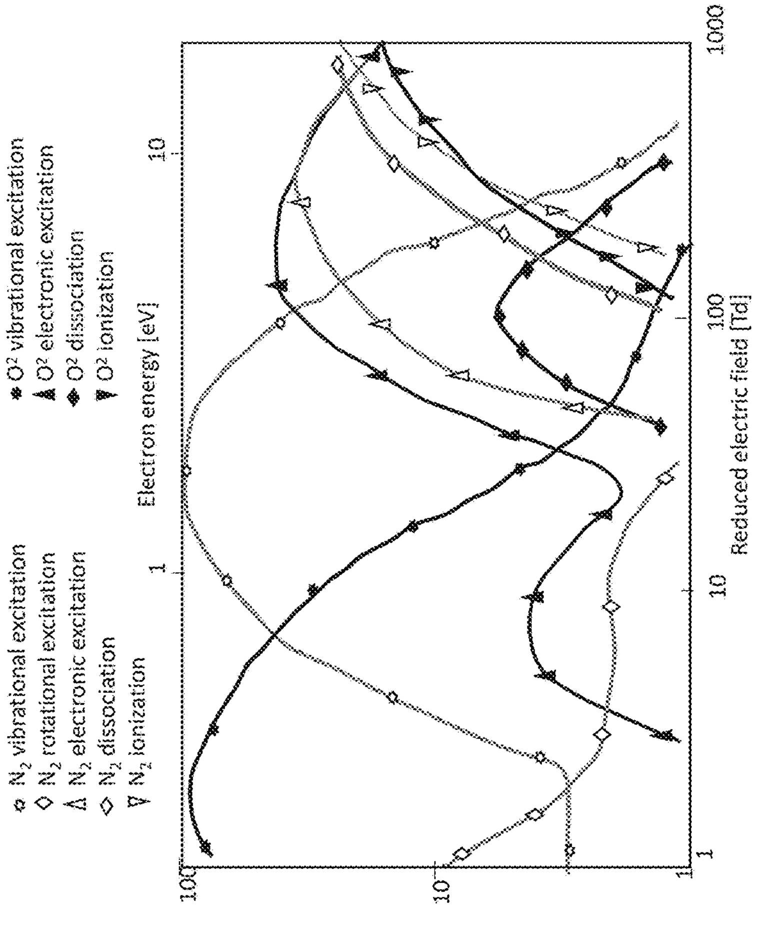
FIG. 2A: Represents the fraction of electron energy transferred to different channels of electronic excitation, vibrational excitation, dissociation, and ionization for nitrogen and oxygen molecules.
Figure 3:
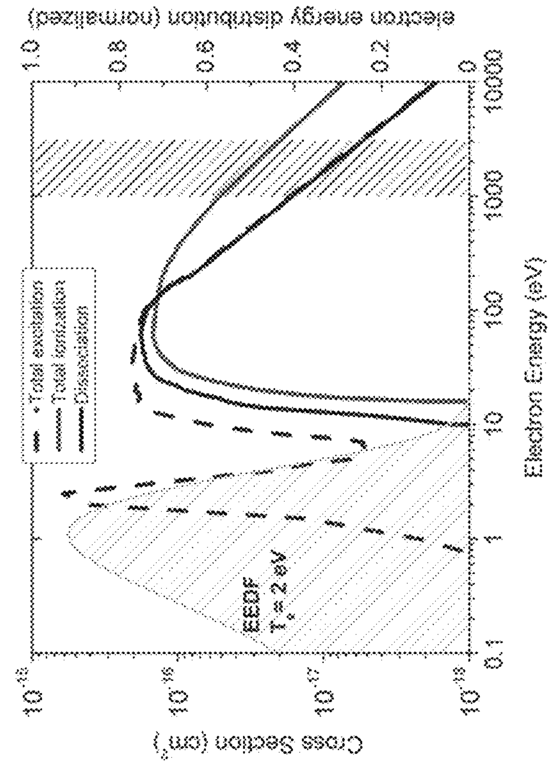
FIG. 3: Electron impact cross section in nitrogen for electron energies up to 10 keV. Also show is a Maxwellian electron energy distribution function representative of a generic discharge with an electron temperature of 2 eV. Note the drastic differences in cross sections for low-energy plasma electrons an 1-3 keV beam electrons (shaded).

The manufacturing of many chemical products relies on the use of feedstocks. In some instances, these feedstocks can be molecular fluids that need to be dissociated partially or entirely into their atomic state in order to produce radicals that react with other chemicals and produce the desired product. This requires the breaking of the chemical bonds that hold together the molecule. The dissociation can be achieved through high temperature (thermal dissociation), catalytic reactions (thermal catalysis), or direct electron impact (where an electron with an optimum energy collides with the molecule and transfers part of its energy into the molecule, which then causes it to dissociate). The limits of the cited processes reside in the fact that the energy required to dissociate the molecules far exceeds the bond energy of these molecules. The excess energy is wasted as heat in the process.

As an example of thermal catalysis, nitrogen gas is fed into a thermal catalytic reactor in a Haber-Bosch process to make it react with hydrogen and produce ammonia. This process operates at high temperature (300 to 500 C) and high pressure (100 to 250 bars).

In plasma processes, in order to minimize the energy required to break these molecular bonds and limit it as much as possible to the bond energy of the specific molecule, one needs to direct the energy specifically into the chemical bond, without wasting any energy in other secondary processes. One way that has been proposed in the literature is the so-called vibrational ladder climbing. In this process, an electron impact initiates a vibrational excitation of the lowest vibrational levels, followed by vibrational-vibrational collisions (ladder-climbing). The vibrational-vibrational collisions continue to gradually populate the higher vibrational levels, till the bond energy is reached, which eventually leads to the dissociation of the molecule.

The vibrational excitation can be achieved through either a photon-molecule interaction, or an electron-molecule interaction.

DEFINITIONS

Low-temperature plasma: Low temperature plasma, or sometimes called non-thermal plasma is defined as a plasma where the energy of the electrons in the plasma is different than the energy of the ions in the plasma. Also, the energy of the electrons in the plasma (from 0.5 eV to 100 eV) is much larger than the energy of the ions in the plasma (from 0.01 eV to 0.5 eV). Also, a low temperature plasma gas temperature is between about 20 C and about 500 C.

Atmospheric pressure: It is defined as a pressure having a value of 1 atmosphere or 760 torr.

Slightly above atmospheric pressure is defined as a pressure having a value between 761 torr and 1300 torr (e.g., about 765 torr).

Slightly below atmospheric pressure is defined as a pressure having a value between 300 torr and 759 torr (e.g., about 750 torr).

Near atmospheric is defined as slightly below atmospheric pressure or slightly above atmospheric pressure.

A metallic foil is defined as a metal sheeting that can be made of aluminum, titanium, beryllium, or any metal or alloy with an atomic mass between 3 and 25 atomic mass units and having a thickness between about 10 μm and and 250 μm, and preferably under 100 μm.

Metallic is defined as consisting entirely or partly of metal or a metal alloy.

The present technology describes a means for producing electrons of an optimum energy that can achieve vibrational excitation of molecular gases. The present technology uses an electron beam generated in a vacuum and accelerated through a thin metallic window into a higher-pressure gas environment to create secondary electrons. Due to the absence of any applied electric field and high pressure in the electron beam channel, secondary electrons quickly thermalize and reach room temperature. Depending on the nature of the gas and pressure, the temperature of these electrons is between 0.1 and 2 eV.

Tailoring the energy of the secondary electrons to meet the optimum energy for electron impact vibrational excitation of a molecule is key to reducing the overall energy consumption of molecular dissociation. The present technology describes a means of controlling the secondary electron energy so as to optimize it to meet the optimum energy for electron vibrational excitation.

The means described above for providing electrons of optimum energy rely on the application of a pulsed nanosecond pulsed voltage that has a duration that is smaller than the inverse of the plasma frequency. This voltage will in turn generate a nanosecond pulsed electric field that can drive the electrons without affecting the ionic species in the plasma. This pulsed nanosecond voltage is described in U.S. Pat. No. 8,664,561 B2.

The main difference between the method and system described in that patent and the current disclosure is that in U.S. Pat. No. 8,664,561 B2, the pulsed voltage is applied to a low-pressure radio frequency plasma created by an inductively coupled plasma (ICP) source. When the nano pulse is applied, the plasma properties are affected and modified due to the creation of different species, which changes the impedance of the plasma, and which, in turn forces the ICP source to adapt. In the present technology, the plasma is created at atmospheric pressure or higher by an independent source that is the electron beam. When a nanosecond voltage pulse is applied, the plasma characteristics change as different species are created, but that has no effect on electron beam source that created the plasma in the first place. This effectively decouples the means for creating the plasma (electron beam) from the means of controlling it (the pulsed electric field or voltage).

Figure 4:
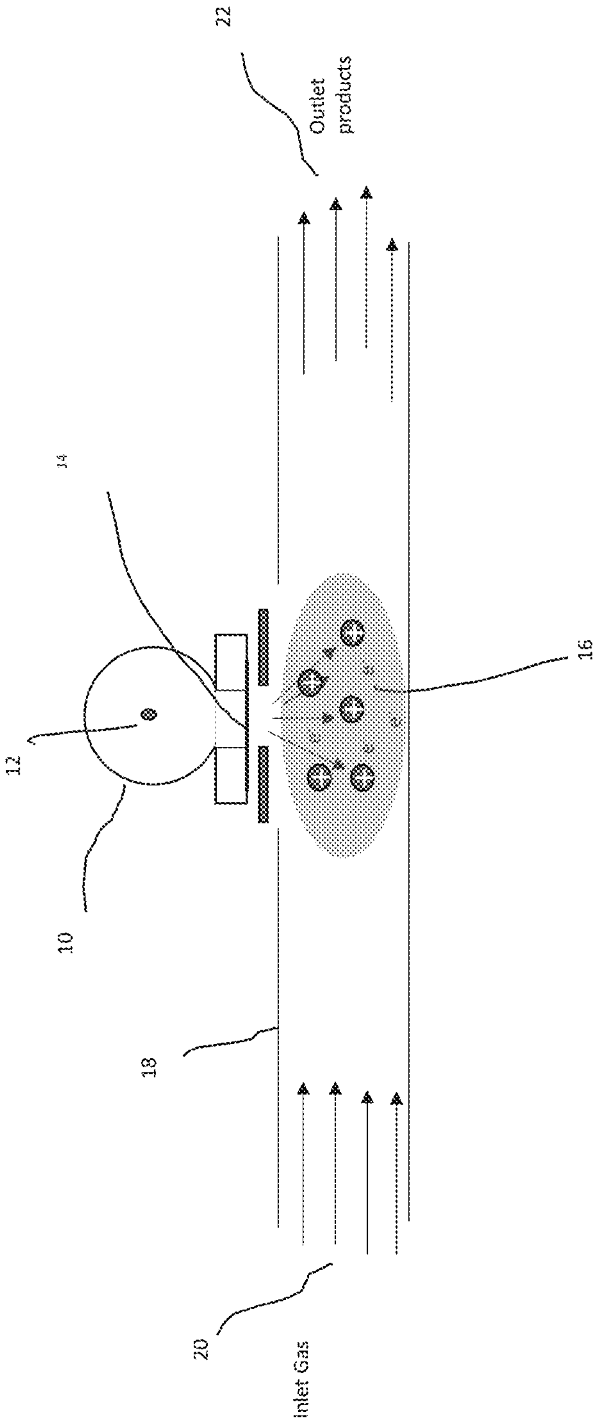
FIG. 4: Electron beam-generating plasma system with a gas channel.

FIG. 4 describes a traditional electron beam system with a plasma generated in a channel. Electrons are produced in the vacuum chamber 10 by a chamber electric assembly that comprises a power source to energize an electron-producing source 12, such as, for example, a hot filament, or a hollow cathode discharge device. The electrons are then accelerated by a high voltage through a thin metallic foil window 14 into an atmospheric or slightly above or below atmospheric pressure to create plasma 16 in channel 18. The acceleration voltage is produced by a high voltage power source that is part of the chamber electric assembly and that is capable of producing a voltage between 10 kvolt and 1 Mvolt. The acceleration voltage can be continuous to produce a continuous stream of an electron beam, or it can be pulsed to produce a pulsed stream of electron beam. In the channel 18, the electrons interact with the molecules of the incoming gas 20 where many plasma and chemical processes take place to produce products 22 that exit the channel 18 at the other end. These fast primary electrons induce several processes such as ionization, excitation, dissociation, and others. Secondary processes such as recombination and others also can take place.

At atmospheric pressure, it takes 33.9 eV[11] to form an ion pair in nitrogen gas when the molecules are bombarded with high energy electrons. For each secondary electron created, one can consider that an energy of 34 eV was spent for the electron to form. However, while a secondary electron is formed, there are also other reactive species that form during the radiation of the molecules by the electron beam. Matzing et al.[12] have produced a model in which they describe all the species produced in respectively nitrogen, oxygen, and water vapor when submitted to high energy electron impact. The equations below are per 100 eV of energy spent:

$$4.43N_2 \rightarrow 0.29N_2^* + 0.885N(^2D) + 0.295N(^2P) + 1.87N(^4S) + 2.27N_2^+ + 0.69N^+ + 2.96e^- \quad (1)$$

$$5.377O_2 \rightarrow 0.077O_2^* + 2.25O(^1D) + 2.8O(^3P) + 0.18O^* + 2.07O_2^+ + 1.23O^+ + 3{:}3e^- \quad (2)$$

$$7.33H_2O \rightarrow 0.51H_2 + 0.46O(^3P) + 4.25OH + 4.15H + 1.99H_2O^+ + 0.01H_2^+ + 0.57OH^+ + 0.67H^+ + 0.060^+ + 3.3e^- \quad (3)$$

For example, as we can see from equation (1), for 100 eV energy, 4.43 molecules of nitrogen get dissociated to form 2.96 secondary electrons in addition to 3.05 metastable nitrogen atoms ($0.885N(^2D)+0.295N(^2P)+1.87N(^4S)$), 0.69 nitrogen ion, 0.29 excited nitrogen molecule, and 2.27 nitrogen molecule ion. Therefore, the 34 eV energy is spent in creating not only a free secondary electron, but also other reactive species such as nitrogen atoms and ions.

It is worth noting that the 3.05 nitrogen metastable atoms created are the sum of the different states that are $N(^2D)$, $N(^2P)$, and $N(^4S)$. It has been reported that the $N(^2D)$ state is more reactive than the $N(^2P)$ state[13,14] and since these states production rates depend on the energy of the impacting electron on the nitrogen molecule, one can think of tuning the electron energy distribution in order to maximize the desired excited state.

For example, in the case of the production of NO as a precursor for the production of nitric acid, we have the following reaction of nitrogen with oxygen with reaction rates k:

$$N(^2D,^2P) + O_2 \xrightarrow{k_1} NO + O$$

$$k_1(N^2D) = 6\times10^{-12}\ cm^3/s^{15}$$

$$k_1(N^2P) < 2\times10^{-12}\ cm^3/s^{16} \quad (4)$$

We can see that the reaction rate of the $N(^2D)$ state with oxygen in reaction (4) is at least 3 times larger than the one for $N(^2P)$. The same reasoning goes for reaction of $N(^2D)$, $N(^2P)$ with hydrogen for the formation of NH in the case of ammonia production.

$$N(^2D,^2P) + H_2 \xrightarrow{k_2} NH + H$$

$$k_2(N^2D) = 1.7\times10^{-12}\ cm^3/s^{17}$$

$$k_2(N^2P) < 8\times10^{-16}\ cm^3/s^{11} \quad (5)$$

Here again we can see in reaction (5) that the $N(^2D)$ state has a reaction rate that is more than 4 orders of magnitude larger than the $N(^2P)$ state for the formation of the NH radical. Being able to control the excited states in order to produce more of the most reactive species is very important to lower the overall energy consumption for the production of ammonia.

We also can notice in equation (1) that secondary electrons are created. These electrons are very slow and have an energy between 0.1 and 1 eV, which is not enough to ionize any further. These low-energy electrons can still be useful if their energy is tailored to optimize specific reactions of interest. Molecular dissociation can occur not only through direct impact of high energy electrons, but also through the so-called vibrationally excited ladder climbing process. During this process, a lower vibrational level of the molecule is excited by a low-energy electron. Then, through vibrational-vibrational collision, the vibrationally excited molecule reaches higher vibrational levels of excitation, which eventually will lead to dissociation when the bond energy is reached. So finding a way to precisely control the electron energy distribution in the plasma can provide a means to increase the overall efficiency of the dissociation process by directing the energy of the electrons towards the vibrational excitation of the molecules and minimizing it for other processes (electronic excitation).

The production of NO and NH described above rely on the reaction of the excited nitrogen atom with other species. We can further improve the overall energy efficiency of the process by increasing the number of nitrogen atomic metastable (preferably the $N(^2D)$ state) by further decomposing the excited nitrogen molecule $N_2^*$ in equation (1) and any remaining neutral nitrogen molecule. This can be done by tuning the energy of the secondary electrons in order to induce a vibrationally excited ladder climbing, which will eventually lead to the dissociation of the nitrogen molecule.

Figure 5:
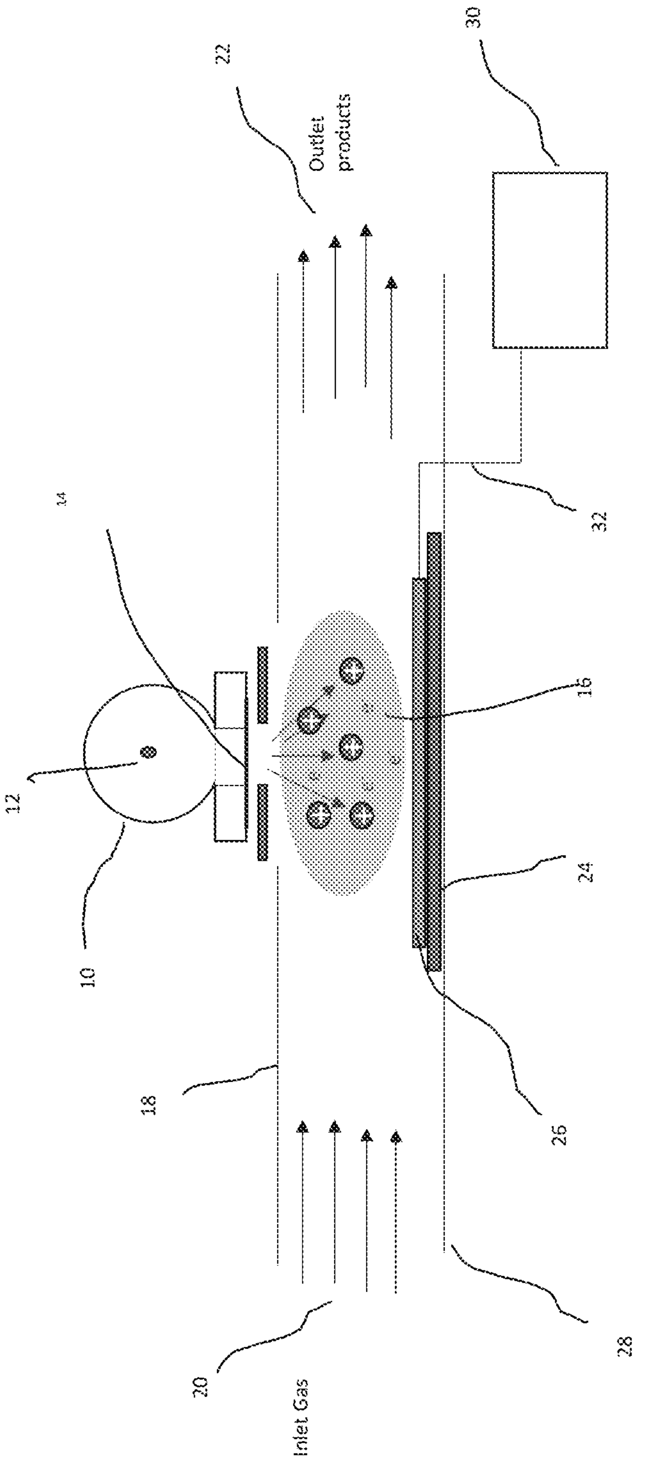
FIG. 5: Electron beam-generating plasma system with a nano pulse voltage system installed in the gas channel.

FIG. 5 describes the electron beam system described in FIG. 4 with an added means for controlling the electron energy distribution of the plasma. An insulating lining 24 is added to the channel 18 to insulate electrode 26 from ground 28. Electrode 26 is connected to power supply 30 through an electric connection 32. The power supply 30 is capable of producing a voltage between 0 and 50,000 volts and that has a duration no longer than 100 nano seconds and that does not exceed the inverse of the electron plasma frequency.

During the plasma processing of molecular gases, a cold plasma 16 is created in channel 18. When power supply 30 is energized to produce pulses of very fast voltage (electric field), the secondary electrons in the plasma will be subject to the electric field and will gain energy, while the ions in the plasma will not get affected due to their much larger mass and inertia. In order for this to happen, the nanosecond electric field pulse duration cannot be larger than the inverse of the electron plasma frequency. For this reason, choosing the right pulse generator is very important.

An embodiment of the present technology features further ionization and dissociation of the molecular species using a repetitive nanosecond voltage pulse by accelerating the low-energy secondary electrons into high energy levels that produce ionization and dissociation. Another parameter for modifying the electron energy distribution of the plasma is by modifying the gas pressure in the channel. Lower pressures will produce higher energy for the secondary electrons, as the collision frequency will get lower, and on the contrary, higher gas pressure in the channel will produce lower energy for the secondary electrons, as the collision frequency increases with pressure. Tailored gas pressure and tailored electron energy distribution can be combined to better control the dissociation process of molecular gases in the electron-beam generated plasma.

Figure 6:
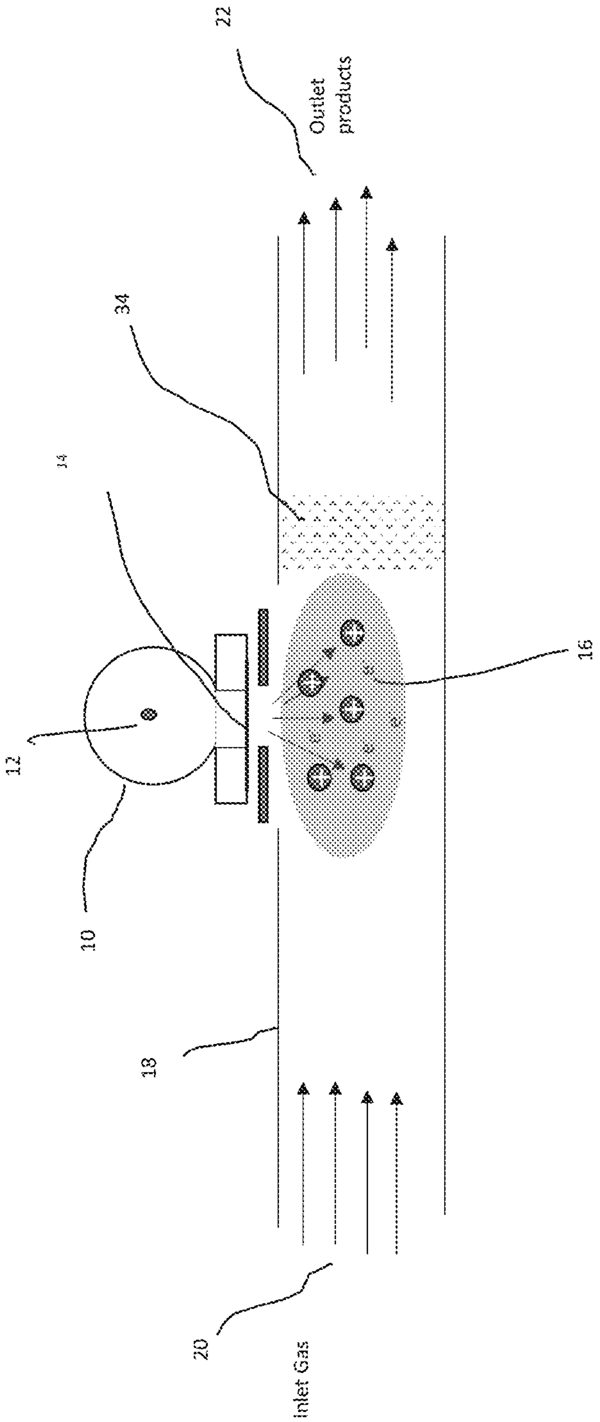
FIG. 6: Electron beam-generating plasma system with a catalyst installed in the gas channel.
Figure 7:
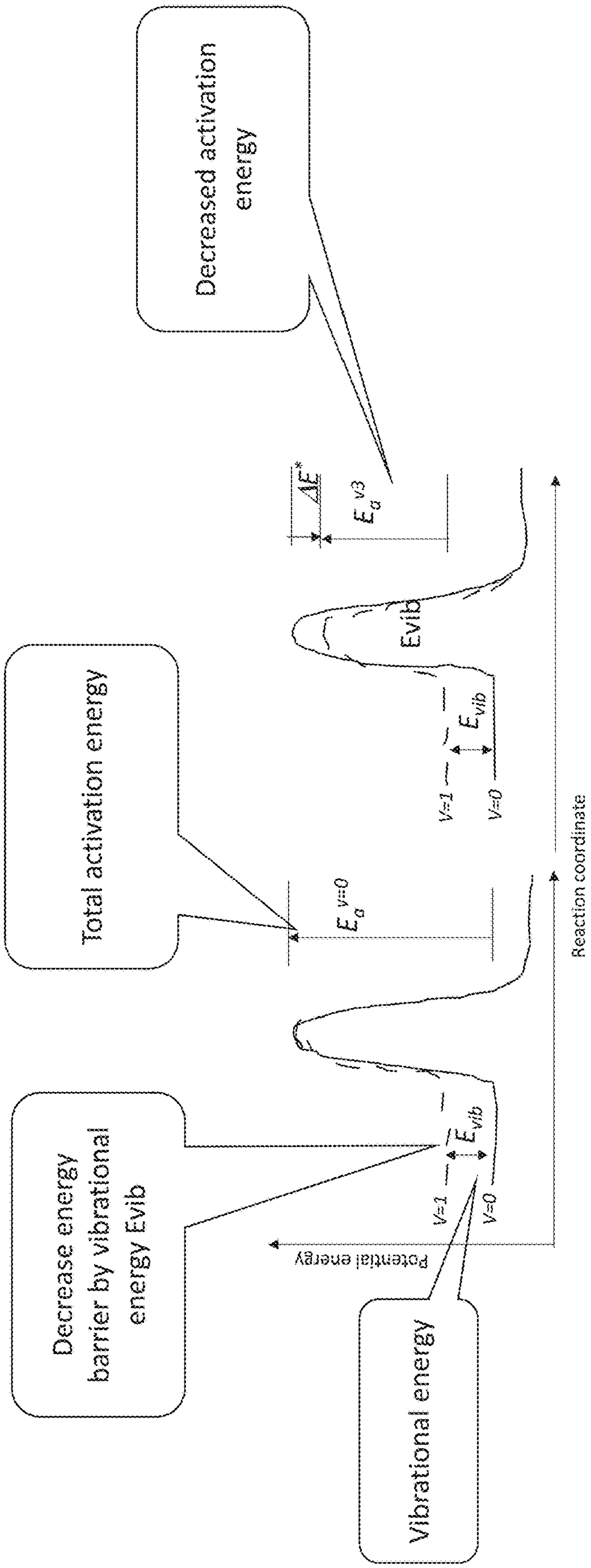
FIG. 7: Activation energy diagram for the nitrogen molecule.

In another embodiment, the electron beam plasma can be combined with a catalyst to improve the reaction rates and increase dissociation efficiency. FIG. 6 describes the same system as in FIG. 4 with added catalyst material 34 in the channel. The catalyst material can be incorporated in the channel at any level, but preferably right adjacent after the plasma. Excited species from the plasma have been shown to require less activation energy for dissociation than non-excited species as described in FIG. 7[18].

Figure 8:
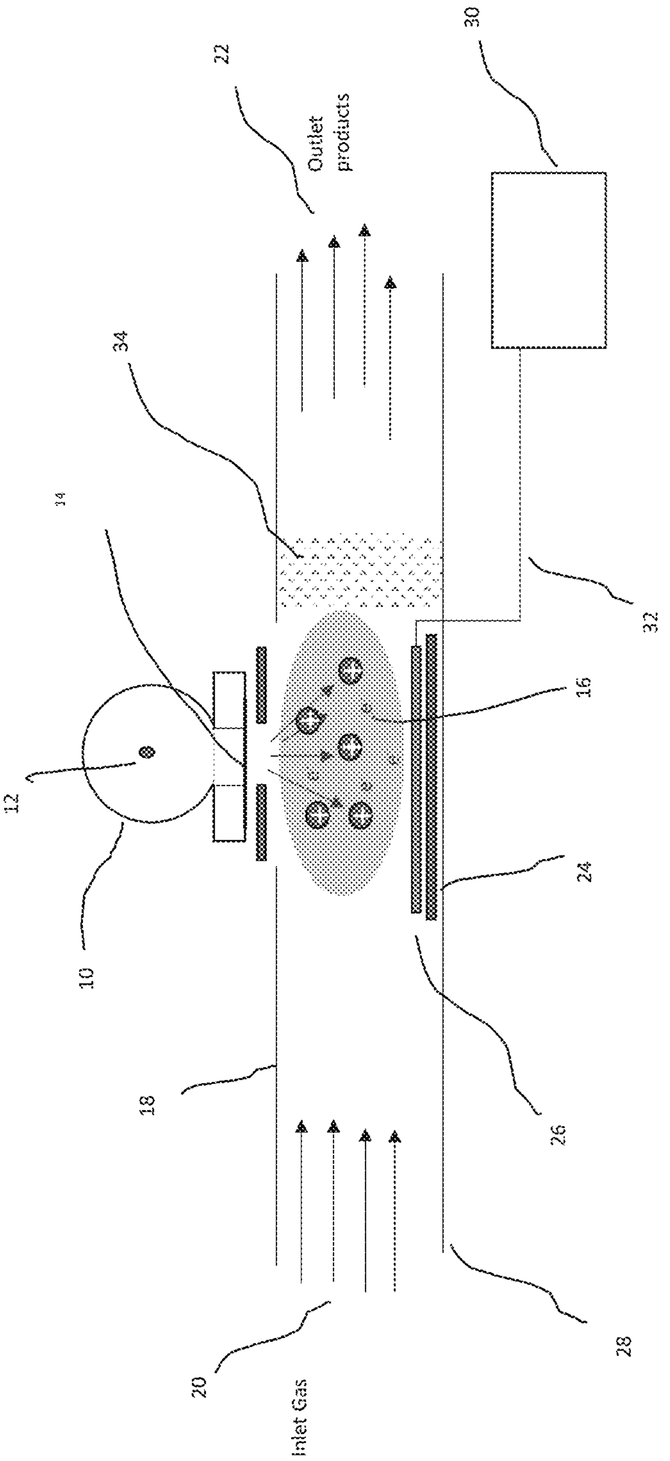
FIG. 8: Electron beam-generating plasma system with a nano pulse voltage system and a catalyst installed in the gas channel.

In yet another embodiment, a catalyst is placed in the gas channel of the electron beam system that is modified with a fast voltage pulse generator as shown in FIG. 8. In this embodiment, the additional voltage pulse will increase the number of excited molecular species, which then will flow into the catalyst, where they get dissociated.

The so-called vibrational ladder climbing provides a less energy-intensive process, as the energy is directed towards making the molecule vibrationally excited to higher states, which leads to instability and eventually dissociation. This resonant dissociation process is well described by Laporta et al[19]. The authors cite on Page 2 of reference 19: "For incident electron energies, however, lower than 4 eV, the vibrational transition occurs via a resonant process involving the 2 Πg state of the $N_2^-$ ion:

$$e^- + N_2(X^1\Sigma^+_g;\vartheta) \rightarrow N^-_2(^2\Pi_g) \rightarrow e^- + N_2(X^1\Sigma^+_g;\omega) \quad (6)$$

where $\vartheta$ and $\omega$ are the initial and final vibrational level of $N_2$. By means of the resonant process in reaction (6) the vibrational-excitation cross section is enhanced by several orders of magnitude. This process is very efficient and makes the vibrational temperature equilibrate very rapidly with the free electron temperature".

Figure 9:
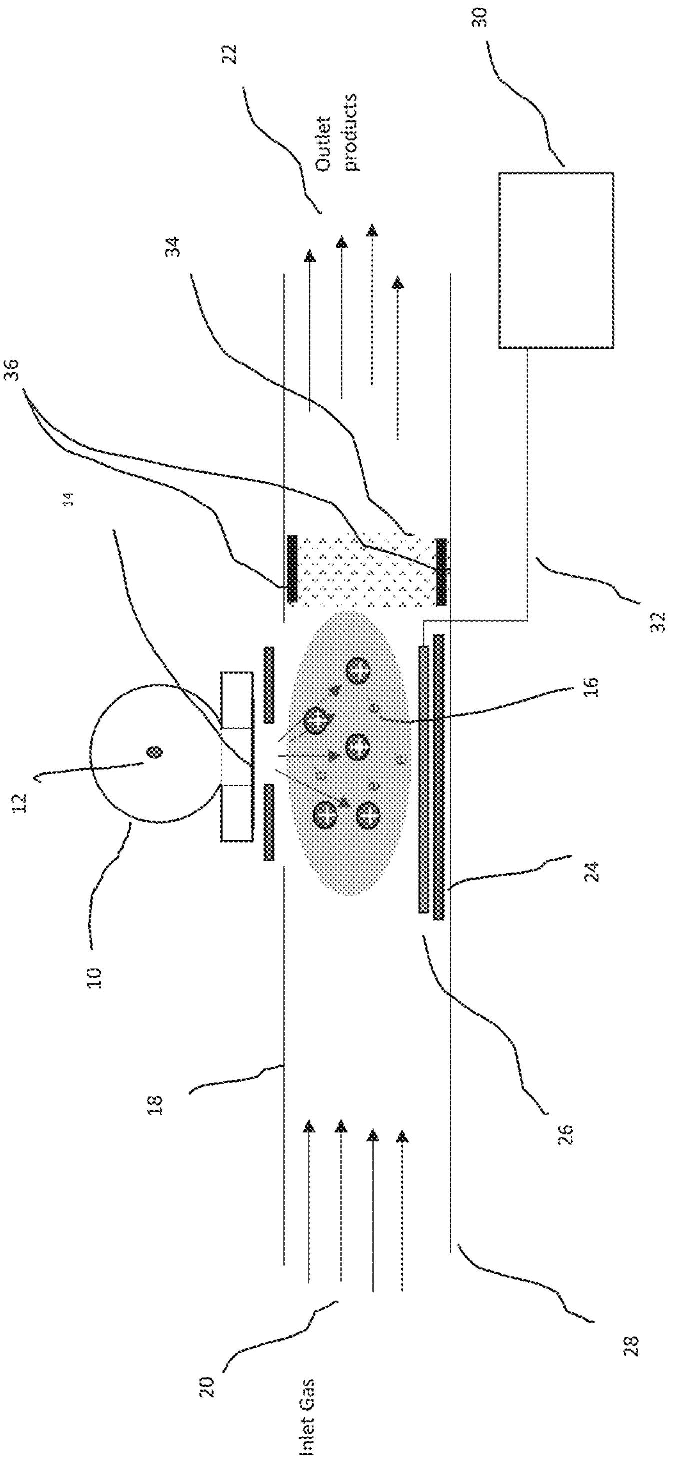
FIG. 9: Electron beam-generating plasma system with a nano pulse voltage system and a catalyst that comprises a heating element installed in the gas channel.

In yet another embodiment, the catalysts material comprises a heating element 36 as shown in FIG. 9. The heating element 36 can be placed around the catalyst material or embedded in it in order to increase the temperature of the catalysts when it is powered by an electric current. Increasing the temperature of the catalyst may lower the energy barrier of the catalyst and increase the dissociation rate of the molecular gases.

In yet another embodiment, the gases that flow through the channel can be comprised of nitrogen, oxygen, methane, carbon dioxide, and water vapor and a mixture of any of these gases.

In yet another embodiment, additives fluids in a gaseous form can be added to the flowing gas or gases. Example of these additives can be hydrogen peroxide vapor, noble gases such as argon, neon and krypton, and other molecular compounds.

Figure 10:
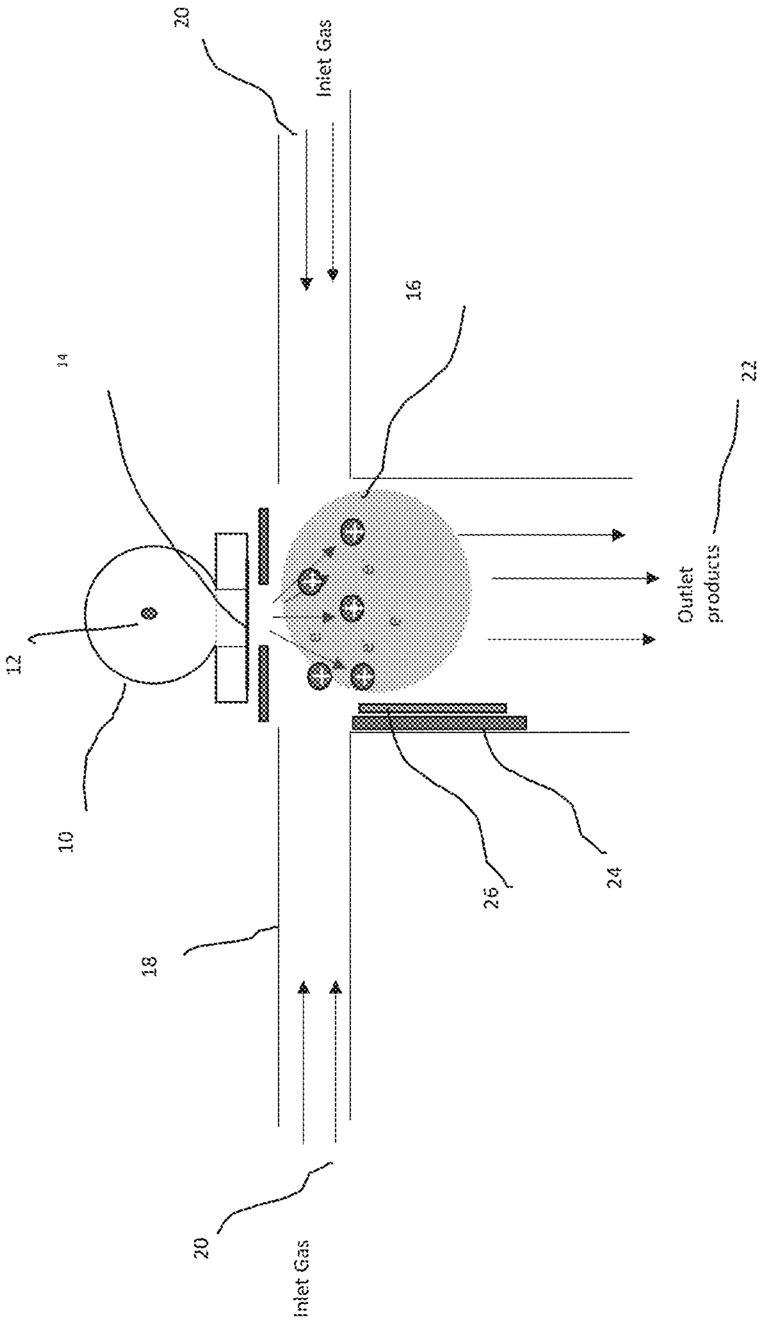
FIG. 10: Electron beam-generating plasma system with a nano pulse voltage system and multiple gas input channels.

In yet another embodiment, the gas channel has multiple inlets and nanosecond pulsed voltage system is placed inside the gas outlet channel as shown in FIG. 10. It is evident to someone of ordinary skill in the art that there are many ways of arranging the electrodes of the nano pulsed voltage system inside the gas channel. Also, for this embodiment, a catalyst material, whether heated or not can be placed inside the gas channel in different ways.

Those skilled in the art will recognize, or be able to ascertain using no more than routine experimentation, numerous equivalents to the specific procedures described herein. Such equivalents were considered to be within the scope of this technology and are covered by the following claims. The contents or all references, issued patents, and published patent applications cited throughout this application are hereby incorporated by reference.

REFERENCES

[1] Kevin H. R. Rouwenhorst et al., Energy Environ. Sci., 2021, 14, 2520-2534.

[2] Kerscher et al. International Journal of Hydrogen Energy Volume 46, Issue 38, 3-6-2021, Pages 19897-19912

[3] Richardson et al. Physics of Plasmas 28, 093508 (2021)

[4] Wei Zhong Wang et al. ChemSusChem 2017, 10, 2145-2157

[5] Ramses Snoeckx and Annemie Bogaerts. Chem. Soc. Rev., 2017, 46, 5805

[6] Walton et al ECS Journal of Solid-State Science and Technology, 4 (6) N5033-N5040 (2015)

[7] Hadidi et al. U.S. Pat. No. 8,664,561 B1

[8] Nobutake Suzuki et al. Journal of Nuclear Science and Technology (Y8), pp. 597-601 (August 1978).

[9] B. M. Penetrante et al. Electron Beam And Pulsed Corona Processing Of Volatile Organic Compounds And Nitrogen Oxides. July 1995. Lawrence Livermore National Laboratory, Livermore, California

[10] Matthew F. Wolford et al. Phys. Chem. Chem. Phys., 2013, 15, 4422

[11] J. Weiss and W. Bernstein. Phys. Rev. 98, 1828-Published 15-6-1955

[12] Matzing H, Baumann W, Paur H R (1996) Chemistry of the electron beam process and its application to emission control. Pure Appl Chem 68 (5): 1089-1092.

[13] HUSAIN, D., Farad. Disc. Chem. Soc. 53 (1972) 201.

[14] DONOVAN, R. J., HUSAIN, D., Chem. Rev. 70 (1970) 489.

[15] LIN, C. L., KAUFMAN, F., J. Chem. Phys. 55 (1971) 3760.

[16] YOUNG, R. A., DUNN, O. J., J. Chem. Phys. 63 (1975) 1150

[17] LIN, C. L., KAUFMAN, F., J. Chem. Phys. 55 (1971) 3760

[18] Smith R R, Killelea D R, Delsesto D F and Utz A L 2004. Science 304 992

[19] V. Laporta et al. Plasma Sources Sci. Technol. 23 (2014) 065002; Page 2.

What is claimed is:

1. A low temperature plasma system for processing of molecular fluids where the plasma is generated at atmospheric pressure or slightly above or slightly below by an electron beam and comprising the followings:

a. a chamber where the electrons are produced at low pressure and where the pressure is between $10^{-3}$ to $10^{-6}$ torr;

b. a window covered by a metallic foil that separates the low-pressure chamber where the electrons are produced from the atmosphere and the electrons are accelerated through the metallic foil;

c. a channel through which a feedstock fluid or a mixture of feedstock fluids flow and that receives the high energy electrons generated in the vacuum chamber and accelerated through the metallic foil;

d. a chamber electric assembly that powers the generation of electrons in the low pressure chamber and the acceleration of these electrons through the window e. a channel electric assembly that is decoupled from the chamber electric assembly and that supplies nanosecond pulsed voltage to a system of electrodes when activated and where the electric assembly produces a nanosecond pulsed voltage with a repetitive rate; and f. a system of electrodes in the channel that is isolated from the ground and that is electrically connected to the channel electric assembly.

2. The system of claim 1 where the duration of the pulsed voltage is between 0.1 and 100 nanoseconds.

3. The system of claim 1, where the fluid is a gas.

4. The system of claim 1 where the fluid is a vapor.

5. The system of claim 1, where the fluid flowing through the channel is one of the following gases or a mixture of any of them: methane, oxygen, nitrogen, carbon dioxide, hydrogen, water vapor, hydrogen peroxide.

6. The system of claim 1, where the duration of the voltage delivered by the channel electric assembly is between 0.01 and 10 nanoseconds.

7. The system of claim 1, where the channel through which the fluid flows is made of multiple input channels.

8. The system of claim 1, where the chamber electric assembly extracts electrons from the chamber to the channel in a continuous manner.

9. The system of claim 1, where the extraction voltage of the electrons is between 10 kvolt and 1 Mvolt.

10. The system of claim 1, where the chamber electric assembly extracts electrons from the chamber to the channel in a pulsed manner.

11. The system of claim 1, where the channel electric assembly has a repetition rate between 500 Hz and 100 MHz.

12. The system of claim 1, where the channel electric assembly has a repetition rate between 1 kHz and 1 MHz.

13. The system of claim 1, with a catalyst material placed in the channel adjacent to the plasma.

14. The system of claim 13, where the catalysts comprise a heating element to increase its temperature.

* * * * *